(12) United States Patent
Yoshida

(10) Patent No.: US 10,773,580 B2
(45) Date of Patent: Sep. 15, 2020

(54) ROOF LOCK DEVICE

(71) Applicant: WEBASTO JAPAN CO., LTD., Higashihiroshima-shi, Hiroshima (JP)

(72) Inventor: Osamu Yoshida, Higashihiroshima (JP)

(73) Assignee: WEBASTO JAPAN CO., LTD., Hiroshima (JP)

( * ) Notice: Subject to any disclaimer, the term of this patent is extended or adjusted under 35 U.S.C. 154(b) by 143 days.

(21) Appl. No.: 16/084,899

(22) PCT Filed: Feb. 27, 2017

(86) PCT No.: PCT/JP2017/007491
§ 371 (c)(1),
(2) Date: Sep. 13, 2018

(87) PCT Pub. No.: WO2017/159316
PCT Pub. Date: Sep. 21, 2017

(65) Prior Publication Data
US 2019/0070941 A1 Mar. 7, 2019

(30) Foreign Application Priority Data
Mar. 18, 2016 (JP) .................. 2016-055030

(51) Int. Cl.
| | |
|---|---|
| *B60J 7/185* | (2006.01) |
| *E05B 81/18* | (2014.01) |
| *E05B 81/36* | (2014.01) |
| *E05B 81/90* | (2014.01) |
| *E05B 83/00* | (2014.01) |
| *E05B 79/20* | (2014.01) |
| *E05B 81/06* | (2014.01) |

(52) U.S. Cl.
CPC ............. *B60J 7/1851* (2013.01); *B60J 7/185* (2013.01); *B60J 7/1855* (2013.01); *E05B 81/18* (2013.01); *E05B 81/36* (2013.01); *E05B 81/90* (2013.01); *E05B 83/00* (2013.01); *E05B 79/20* (2013.01); *E05B 81/06* (2013.01)

(58) Field of Classification Search
CPC ........ B60J 7/1851; B60J 7/185; B60J 7/1855; E05B 83/00; E05B 81/90; E05B 81/36; E05B 81/18; E05B 81/06; E05B 79/20
USPC ...................................................... 296/121
See application file for complete search history.

(56) References Cited

U.S. PATENT DOCUMENTS

| | | | | |
|---|---|---|---|---|
| 6,988,749 B2 * | 1/2006 | Hashiba | ................. | E05B 81/14 292/201 |
| 2004/0155469 A1 | 8/2004 | Homann et al. | | |
| 2010/0283286 A1 | 11/2010 | Odoi et al. | | |

FOREIGN PATENT DOCUMENTS

| | | |
|---|---|---|
| JP | 2004-218426 A | 8/2004 |
| JP | 2006-232083 A | 9/2006 |
| JP | 2007-069705 A | 3/2007 |
| JP | 2007-261405 A | 10/2007 |

(Continued)

*Primary Examiner* — Pinel E Romain
(74) *Attorney, Agent, or Firm* — Maschoff Brennan

(57) ABSTRACT

A roof lock device includes a driver 60 having an electric motor 61, a drive gear 62 driven to rotate by the electric motor 61, and a link member 70 coupling the drive gear 62 and the hook member 80 together, and allowing the hook member 80 to reciprocate longitudinally along with the rotation of the drive gear 62. the driver 60 further has a manually operable gear 99 disposed to mesh with the drive gear 62 and is able to be rotated by a certain tool.

1 Claim, 14 Drawing Sheets

(56) References Cited

FOREIGN PATENT DOCUMENTS

JP 2007-261412 A 10/2007

* cited by examiner

ROOF LOCK DEVICE

TECHNICAL FIELD

The present disclosure relates to a roof lock device for a vehicle.

BACKGROUND ART

Vehicles including an opening/closing device switchable between a closed state in which a top of a cabin is covered with a roof member and an opened state in which the top of the cabin is uncovered have been known.

For example, Patent Document 1 discloses a vehicle roof member including a front roof panel and a back roof panel which are coupled to a drive motor via a link mechanism. Also, the opening/closing device includes a trunk lid opening/closing a storage near a trunk.

During the opening operation of the roof member, the trunk lid is moved so as to open the storage, and then, the front roof panel and the back roof panel are retracted into the storage. Thereafter, the trunk lid closes the storage, again. As a result, the top of the vehicle is uncovered.

During the closing operation of the roof member, the trunk lid is moved so as to open the storage, and then, the front roof panel and the back roof panel are moved to the top of the vehicle. Thereafter, the trunk lid closes the storage, again. As a result, the top of the vehicle is covered.

Patent Document 2 discloses a roof lock device for locking the roof member covering the top of the cabin to a vehicle body. The roof lock device is attached to the front end of the roof member. The roof lock device includes a hook member engageable, from below, with an engaged portion (striker) fixed to the vehicle body. The hook member engages with the striker to be in the locked state, firmly fixing the roof member to the vehicle body.

CITATION LIST

Patent Documents

[Patent Document 1] Japanese Unexamined Patent Publication No. 2007-261412
[Patent Document 2] Japanese Unexamined Patent Publication No. 2006-232083

SUMMARY OF THE INVENTION

Technical Problem

As the above-described roof lock device, a configuration is conceivable in which a driver having an electric motor is mounted, and the motor is driven to allow the hook member to switch between the locked state and the unlocked state. Specifically, the driver is provided with the electric motor, a drive gear driven to rotate by the electric motor, and a link member converting the rotating motion of the rotator into a reciprocating motion of the hook member. This allows the hook member to move forward or rearward in synchronization with the electric motor. This movement can allow the hook member to switch between the locked state and the unlocked state.

However, if the electric motor is broken, such an electrically operated roof lock device might not allow the hook member to switch between the locked state and the unlocked state. Specifically, for example, if the electric motor is broken in a situation where the hook member is locked, the roof member cannot be moved and the top of the vehicle cannot be uncovered. Also, if the electric motor is broken in a situation where the roof member covers the top of the vehicle, the hook member cannot be locked, and the vehicle body and the roof member cannot be fixed together.

The present disclosure is conceived in view of the above problems, and attempts to provide a roof lock device capable of moving a hook member with a simple configuration even if an electric motor is broken.

Solution to the Problem

A first aspect of the present disclosure is directed to a roof lock device a roof lock device which is disposed in a roof member of a vehicle, and which includes a hook member switchable between a locked state where the hook member engages with an engaged portion of a body of the vehicle, and an unlocked state where the hook member disengages from the engaged portion, the roof lock device including a driver having an electric motor, a drive gear driven to rotate by the electric motor, and a link member coupling the drive gear and the hook member together, and allowing the hook member to reciprocate longitudinally along with the rotation of the drive gear, wherein the driver further has a manually operable gear disposed to mesh with the drive gear and is able to be rotated by a certain tool.

According to this configuration, if the electric motor drives and rotates the drive gear, the rotating motion of the drive gear is converted into the reciprocating motion of the hook member via the link member. This allows the hook member to move forward or rearward, switching between the locked state and the unlocked state. At this time, an auxiliary gear meshing with the drive gear simply rotates without rotating any other members.

For example, if the electric motor is broken, the electric motor cannot allow the hook member to reciprocate. In this case, the driver or other person rotates the manually operable gear using a certain tool. As a result, the drive gear meshing with the manually operable gear rotates, allowing the hook member to move to a desired position.

A second aspect of the present disclosure is an embodiment of the first aspect. In the second aspect, the manually operable gear has a diameter smaller than the drive gear.

In this configuration, the manually operable gear has a smaller diameter than the drive gear. This can reduce the size of the device. Also, the manually operable gear has a reduced size, making it possible to reduce the load on the electric motor, too.

Advantages of the Invention

According to the present disclosure, even if, e.g., the electric motor is broken, rotating the manually operable gear can move the hook member. Therefore, even in emergency, such a simple configuration can easily allow the hook member to switch between the locked state and the unlocked state, providing the roof lock device with improved convenience without losing its reliability.

DESCRIPTION OF EMBODIMENTS

An embodiment of the present disclosure will now be described in detail with reference to the drawings. Note that the following description of embodiments is merely examples in nature, and is not intended to limit the scope, application, or uses of the present disclosure.

Figure 1:
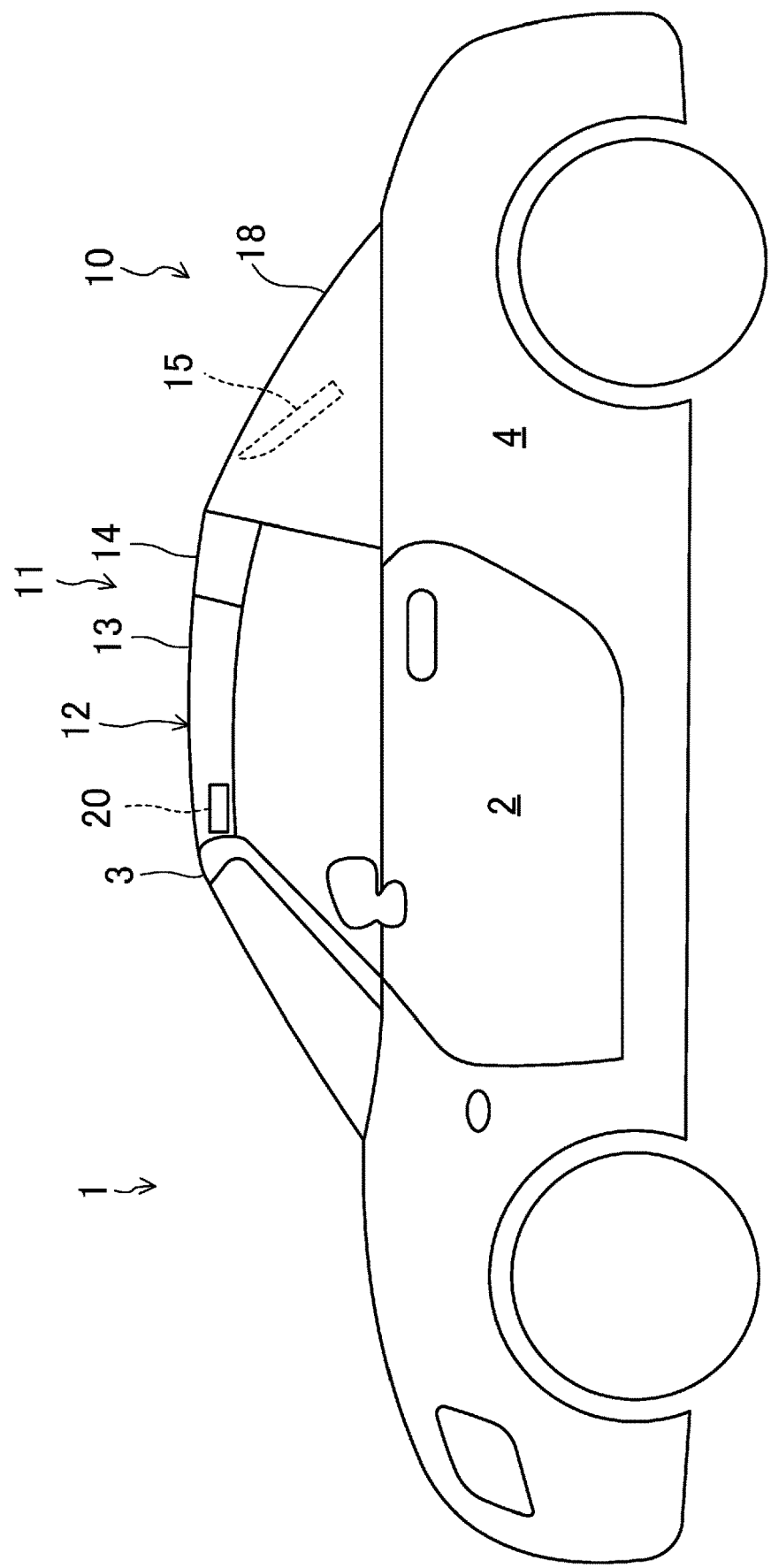
FIG. 1 is a schematic side view illustrating a general configuration of a vehicle according to an embodiment, with a cabin being closed.
Figure 2:
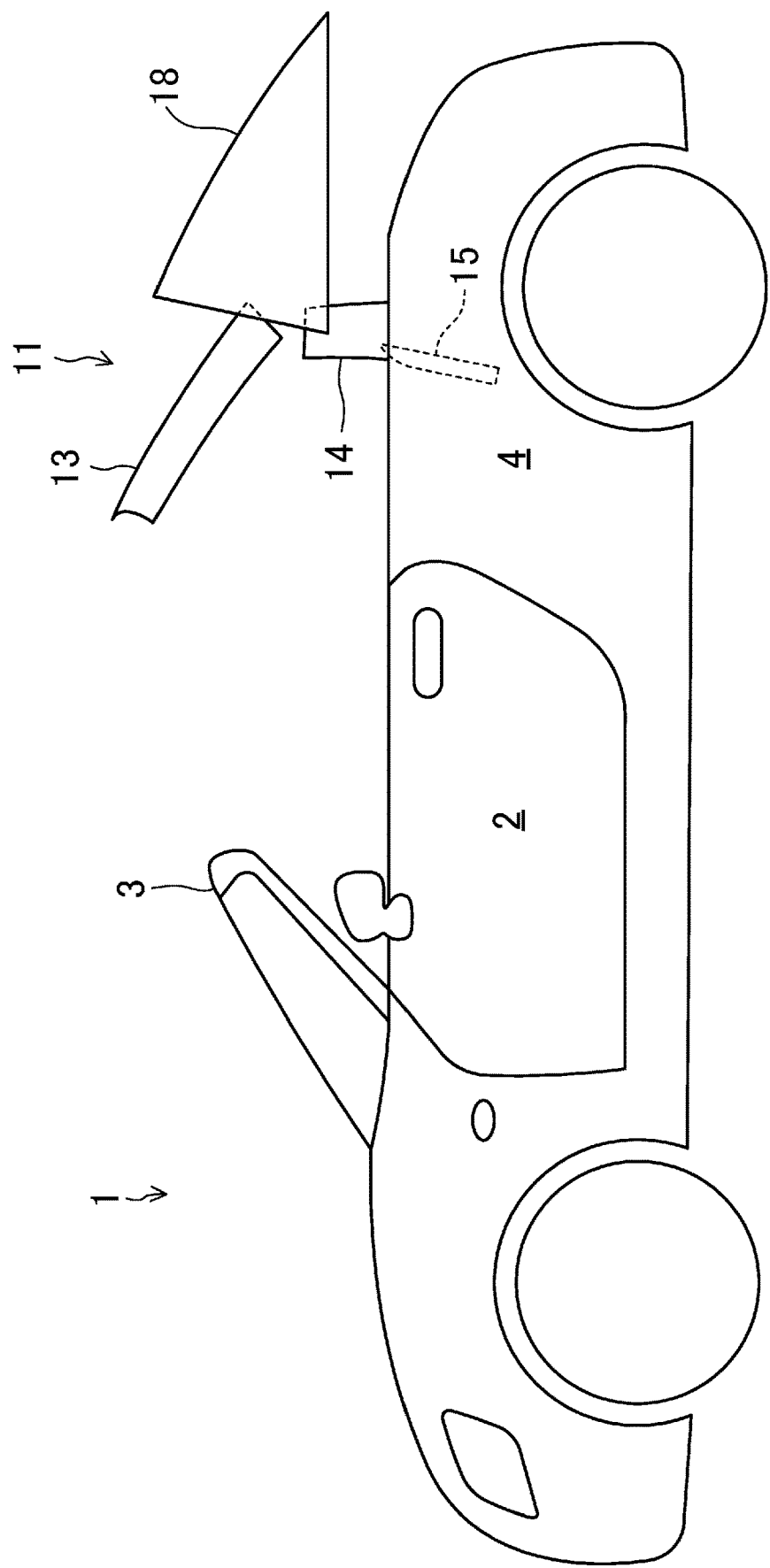
FIG. 2 is a schematic side view illustrating the general configuration of the vehicle according to the embodiment, with a retractable roof being located between a use position and a retracted position, and a deck cover being at a retreated position.
Figure 3:
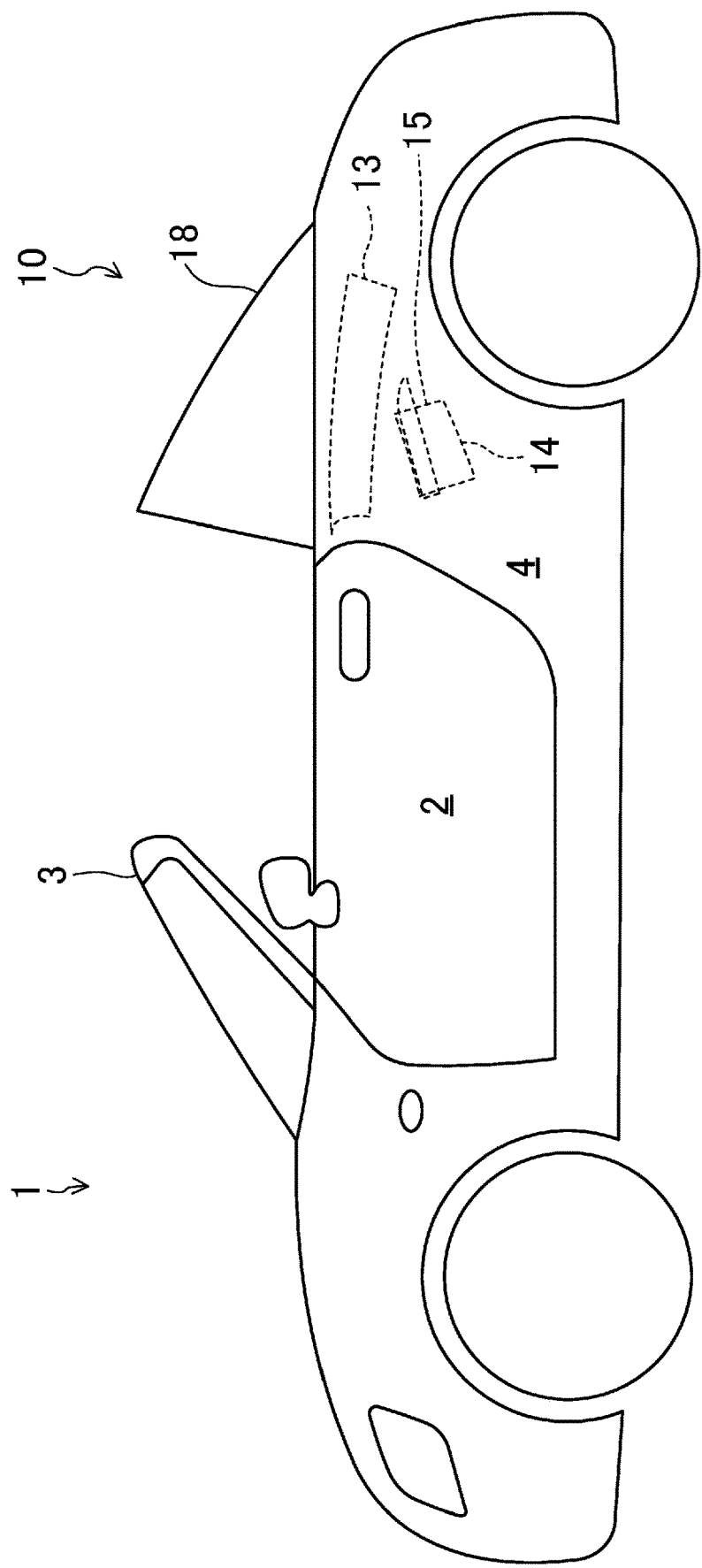
FIG. 3 is a schematic side view illustrating the general configuration of the vehicle according to the embodiment, with a cabin being open.

A vehicle 1 according to this embodiment shown in FIGS. 1 to 3 is equipped with an opening/closing device 10. The opening/closing device 10 is switchable between a closed state in which a top of a cabin 2 is covered with a roof member 12 and an opened state in which the top of the cabin 2 is uncovered. The opening/closing device 10 includes a retractable roof 11, a deck cover 18, and a roof lock unit 20. First, these configurations basically in a state where the cabin 2 is closed (the state shown in FIG. 1) will be described.

<Retractable Roof>

The retractable roof 11 includes a roof member 12, and a back window 15 located behind the roof member 12. The roof member 12 extends in a longitudinal direction of the vehicle from an upper edge of a front header 3 of the vehicle 1 to an upper edge of the deck cover 18. The roof member 12 includes a front roof panel 13, and a middle roof panel 14 disposed behind the front roof panel 13. The back window 15 is a transparent member, and disposed above a storage 4 formed in a rear portion of the vehicle 1.

The retractable roof 11 is driven by a roof drive mechanism (not shown). Specifically, the roof drive mechanism includes a first drive motor, and a first link mechanism which links the first drive motor and the retractable roof 11 together. The first link mechanism transfers rotational power of the first drive motor to the front roof panel 13, the middle roof panel 14, and the back window 15. Thus, the retractable roof 11 is movable between a use position (shown in FIG. 1) and a retracted position (shown in FIG. 3). The retractable roof 11 in the use position is located outside the storage 4 to cover the cabin 2. The retractable roof 11 in the retracted position is retracted into the storage 4, thereby uncovering the cabin 2.

<Deck Cover>

As shown in FIG. 1, the deck cover 18 is disposed behind the roof member 12 and above the storage 4. Specifically, the deck cover 18 covers the cabin 2 from behind, and closes a top opening of the storage 4. The deck cover 18 is provided with a window frame (not shown) to be fitted with the back window 15.

The deck cover 18 is driven by a deck drive mechanism (not shown). Specifically, the deck drive mechanism includes a second drive motor, and a second link mechanism which links the second drive motor and the deck cover 18 together. The second link mechanism transfers rotational power of the second drive motor to the deck cover 18. Thus, the deck cover 18 is movable between a home position (shown in FIGS. 1 and 3) and a retreated position (shown in FIG. 2, for example).

The deck cover 18 in the home position covers the top opening of the storage 4, and allows the back window 15 to be fitted in the window frame in the storage 4. The deck cover 18 in the retreated position is located further rearward and diagonally upward than in the home position, and uncovers the top opening of the storage 4. Thus, the deck cover 18 in the retreated position allows the retractable roof 11 to move between the use position and the retracted position.

<Roof Lock Device>

Figure 13:
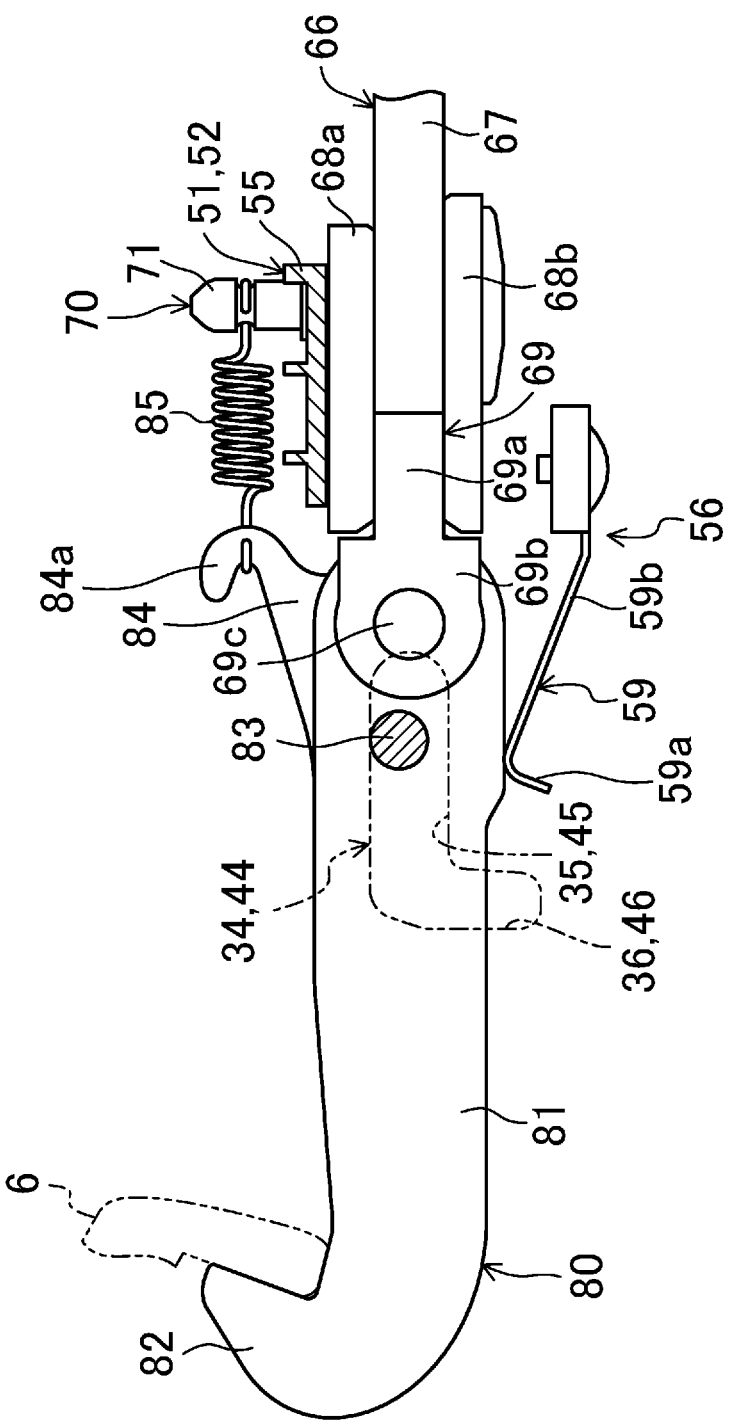
FIG. 13 is an enlarged, vertical cross-sectional view of a major part of a driver when the hook member is in the locked state.
Figure 14:
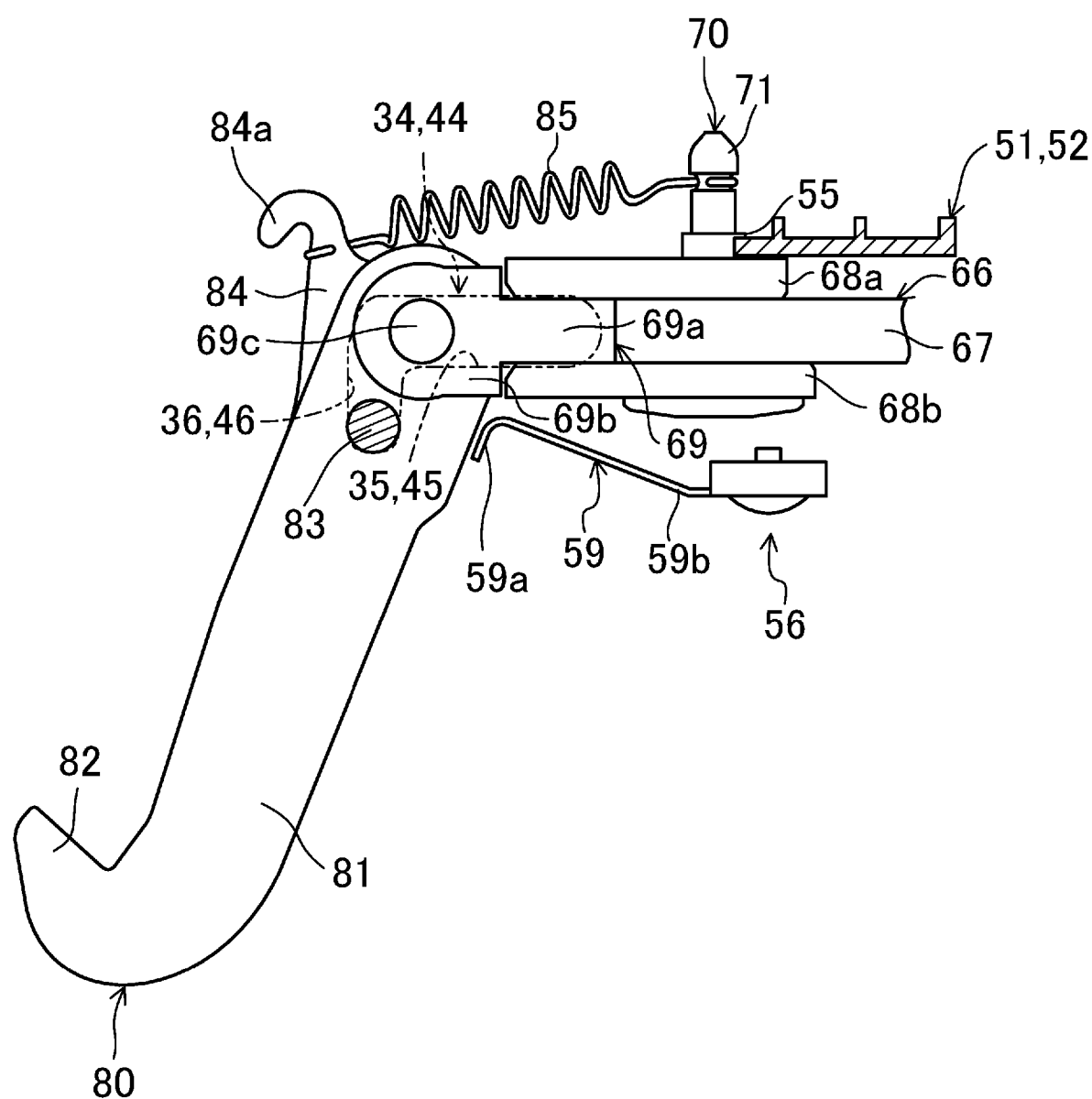
FIG. 14 is an enlarged, vertical cross-sectional view of a major part of the driver when the hook member is in the unlocked state.

The roof lock device 20 is attached to a front end of a lower surface (surface toward the inside of the cabin) of the front roof panel 13. The roof lock device 20 includes a hook member 80 which is able to engage with a striker 6 (an engaged portion) fixed to a body (the front header 3) of the vehicle 1 (see, e.g., FIG. 13). When the retractable roof 11 is in the use position, the hook member 80 engages with the striker 6 so as to lock the roof member 12 and the front header 3 together.

Operation of Opening/Closing Device

The opening operation and the closing operation of the opening/closing device 10 will be described with reference to FIGS. 1 to 3. The "opening operation" is performed to bring the retractable roof 11 in the use position to the retracted position. The "closing operation" is performed to bring the retractable roof 11 in the retracted position to the use position.

In the opening operation, the roof lock device 20 unlocks the front header 3. Further, the deck cover 18 in the home position moves toward the retreated position. Then, the retractable roof 11 in the use position moves toward the retracted position.

Specifically, the front roof panel 13, the middle roof panel 14, and the back window 15 independently pivot via a plurality of link members (not shown) so that they move together toward the storage 4 (see, e.g., FIG. 2). When the front roof panel 13, the middle roof panel 14, and the back window 15 are all stored in the storage 4 in a folded state, the deck cover 18 in the retreated position returns to the home position (see FIG. 3). Thus, the cabin 2 is in the opened state.

To close the cabin 2 in the opened state, first, the deck cover 18 in the home position moves toward the retreated position. Then, the retractable roof 11 in the retracted position moves toward the use position.

Specifically, the front roof panel 13, the middle roof panel 14, and the back window 15 independently pivot via the plurality of link members so that they move together toward the cabin 2 (see, e.g., FIG. 2). Thereafter, the retractable roof 11 reaches the use position, and the deck cover 18 in the retreated position returns to the home position (see FIG. 1). Thus, the cabin 2 is in the closed state. Subsequently, the roof lock device 20 locks the front header 3.

<Detailed Configuration for Roof Lock Device>

A detailed configuration of the roof lock device 20 will be described in detail below with reference to FIGS. 4 to 14. The roof lock device 20 is fixed to a front portion of the lower surface of the front roof panel 13. The roof lock device 20 includes a support member 21 attached to the front roof panel 13, a driver 60 supported by the support member 21, and the hook member 80 driven by the driver 60.

[Support Member]

As shown in FIGS. 4 to 8, the support member 21 has a motor supporting plate 22 formed in a rear portion of the roof lock device 20, a pair of brackets 30 and 40 formed in a front portion of the roof lock device 20, a pair of guide members 51 and 52 disposed between the pair of brackets 30 and 40, and a plate spring member 56 disposed below the pair of guide members 51 and 52.

The motor supporting plate 22 is formed in the shape of a horizontally flat plate. A middle portion of the front edge of the motor supporting plate 22 is recessed rearward to form a cutout 23 (see FIG. 6). In the interior of the cutout 23, rear ends of side plates 32 and 42 of the pair of brackets 30 and 40 are disposed. The middle portion of the motor supporting plate 22 is provided with a bulge 24 bulging upward. The bulge 24 is shaped like a flat truncated cone with its rear portion cut out.

Figure 6:
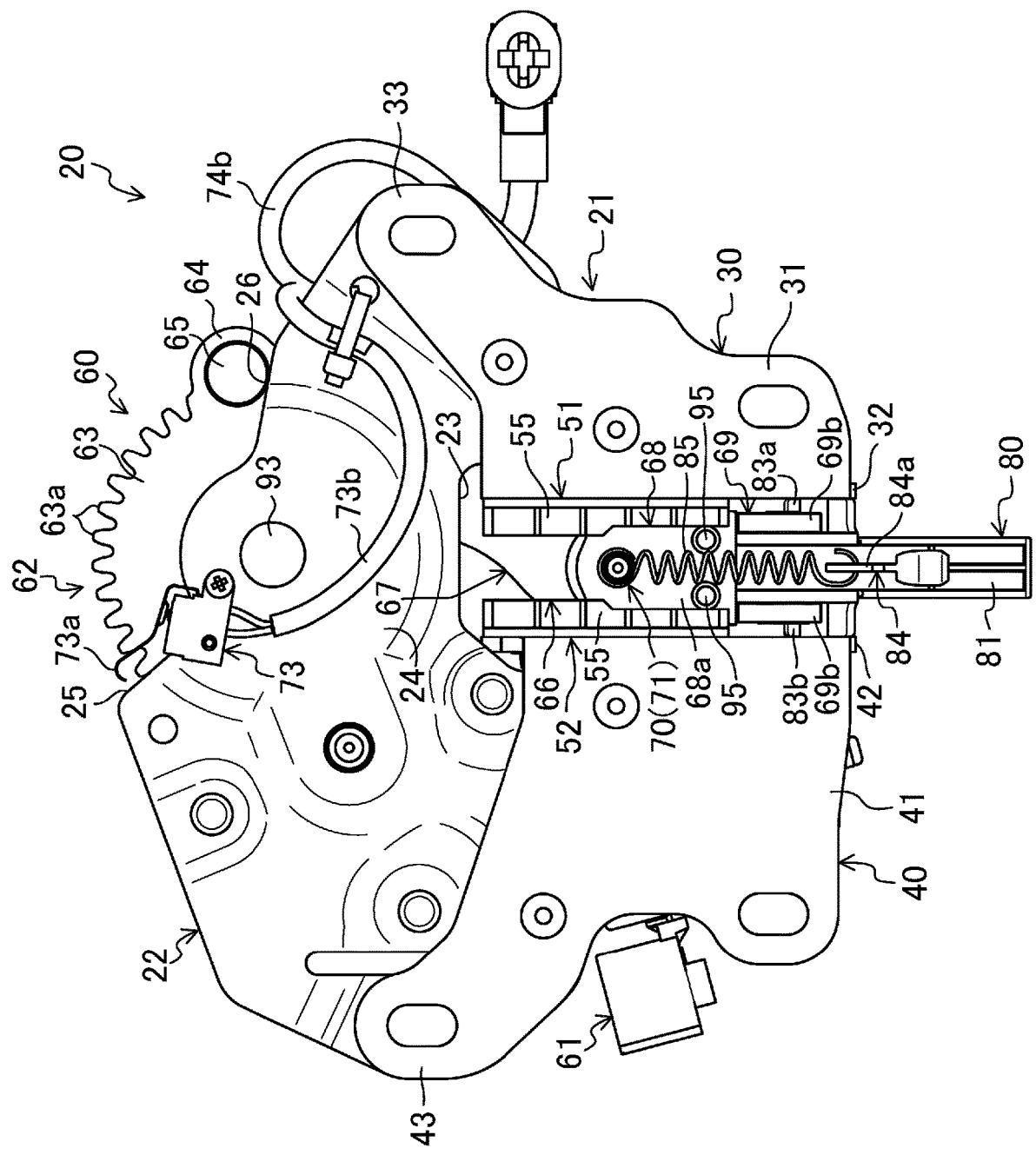
FIG. 6 is a plan view illustrating the general configuration of the roof lock device according to the embodiment, in the unlocked state.

As shown in FIG. 6, the rear edge of the motor supporting plate 22 includes a first contact surface 25 at a position near the center thereof, the first contact surface 25 being in contact with an outer circumferential surface of a stopper 65 of a sector gear 62. The first contact surface 25 constitutes a regulating portion preventing the sector gear 62 in the state of FIG. 6 (a state of a first angular position) from rotating in the counterclockwise direction in FIG. 6 (a first rotation direction).

Figure 12:
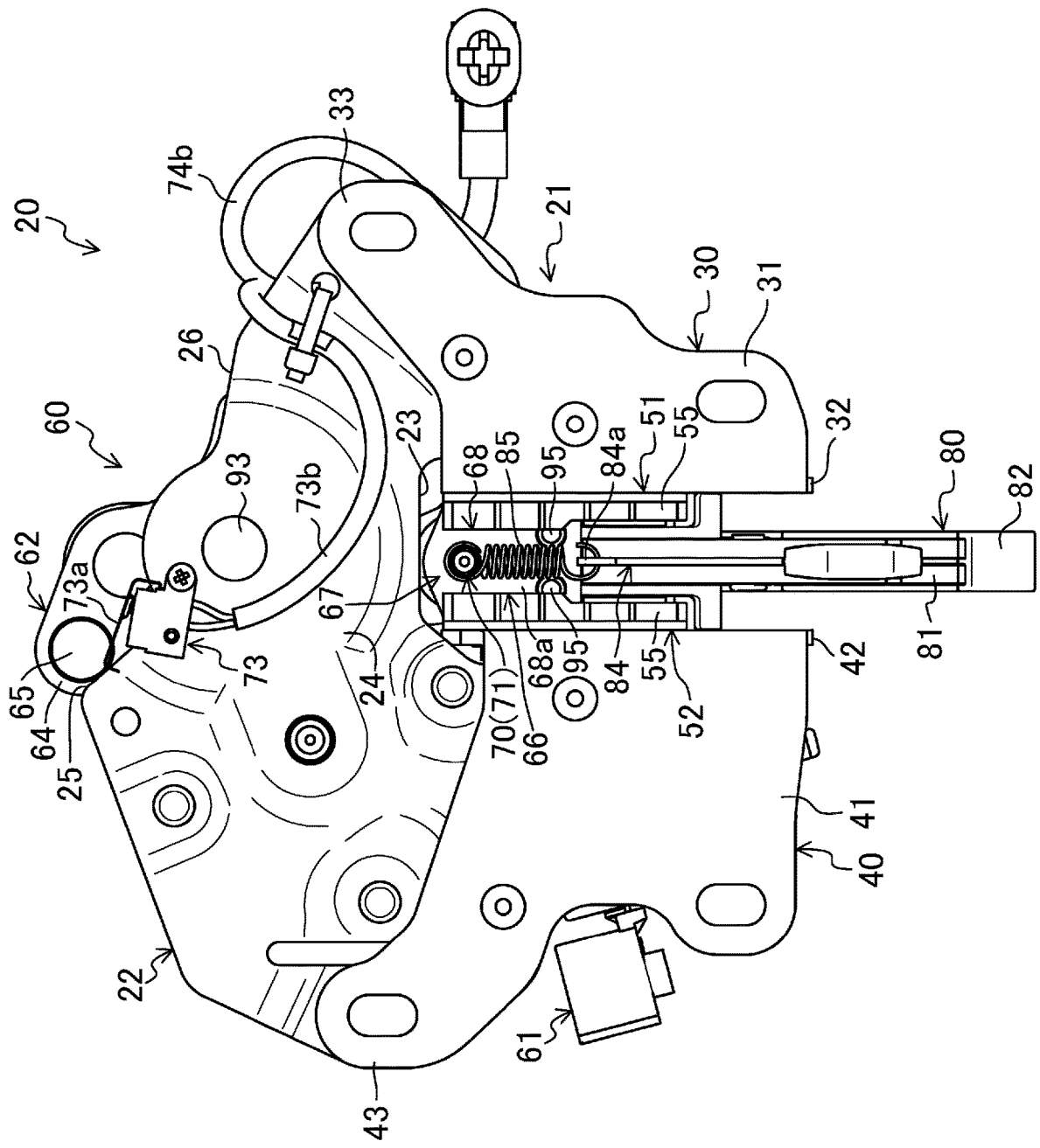
FIG. 12 is a plan view illustrating the general configuration of the roof lock device according to the embodiment, in the locked state.

As shown in FIG. 12, the rear edge of the motor supporting plate 22 includes a second contact surface 26 at a position near the right side thereof, the second contact surface 26 being in contact with the stopper 65 of the sector gear 62. The second contact surface 26 constitutes a regulating portion preventing the sector gear 62 in the state of FIG. 12 (a state of a second angular position) from rotating in the clockwise direction in FIG. 12 (a second rotation direction).

As can be seen, the sector gear 62 is allowed to rotate in an angular range from the first angular position to the second angular position, and is prevented from rotating in an angular range other than this angular range. The first angular position is an angular position of the sector gear 62 in a situation where the hook member 80 is in the unlocked state shown in FIGS. 4 to 7. The second angular position is an angular position of the sector gear 62 in a situation where the hook member 80 is in the locked state shown in FIGS. 10 to 12.

The pair of brackets 30 and 40 is comprised of a first bracket 30 disposed on the right side of the hook member 80, and a second bracket 40 disposed on the left side of the hook member 80. The first bracket 30 has a first upper plate 31 and the first side plate 32. The second bracket 40 has a second upper plate 41 and the second side plate 42.

The first upper plate 31 and the second upper plate 41 are formed in the upper end of the roof lock device 20. The first upper plate 31 is provided with a first extending portion 33 extending from its body diagonally rearward to the right. The first extending portion 33 is stacked on the right edge portion of the motor supporting plate 22 to be fixed to the motor supporting plate 22 through a fastening member (not shown). The second upper plate 41 is provided with a second extending portion 43 extending from its body diagonally rearward to the left. The second extending portion 43 is stacked on the left edge portion of the motor supporting plate 22 to be fixed to the motor supporting plate 22 through a fastening member (not shown).

The first and second side plates 32 and 42 are formed in the shape of a plate extending forward from the position near the cutout 23 of the motor supporting plate 22. The first side plate 32 extends downward from the left edge (inner edge) of the first upper plate 31. The second side plate 42 extends downward from the right edge (inner edge) of the second upper plate 41.

The first side plate 32 is provided with a first groove 34 and the second side plate 42 is provided with a second groove 44. The first groove 34 and the second groove 44 have the same shape. The grooves 34 and 44 respectively have lateral grooves 35 and 45 extending in a longitudinal direction of the vehicle (the direction in which the hook member 80 reciprocates) and vertical grooves 36 and 46 extending downward from the front ends of the lateral grooves 35 and 45. That is to say, the grooves 34 and 44 each have a substantially L-shaped vertical cross section.

Figure 7:
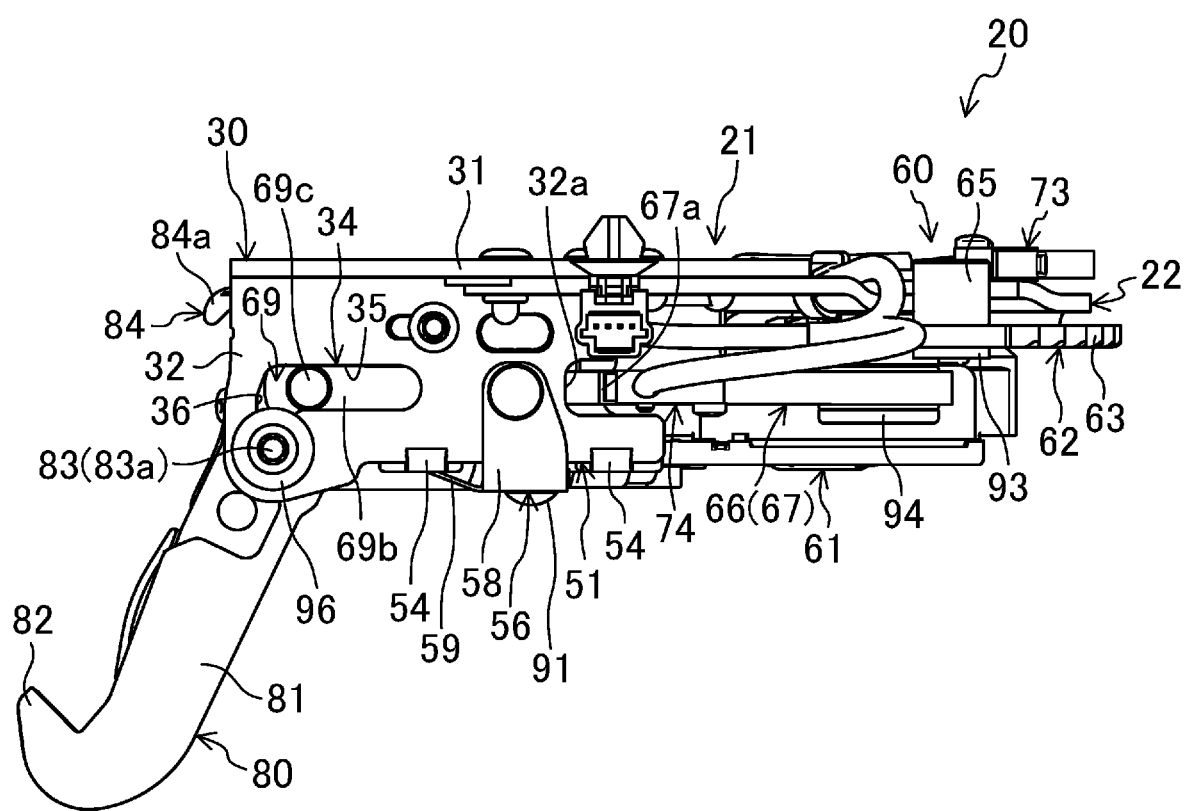
FIG. 7 is a right side view illustrating the general configuration of the roof lock device according to the embodiment, in the unlocked state.

As shown in FIG. 7, the intermediate portion of the rear edge of the first side plate 32 in the width direction (vertical direction) is recessed forward to form a cutout recess 32a. The interior of the cutout recess 32a is provided with a space in which an edge portion 67a provided to the link member 66 is movable.

Figure 8:
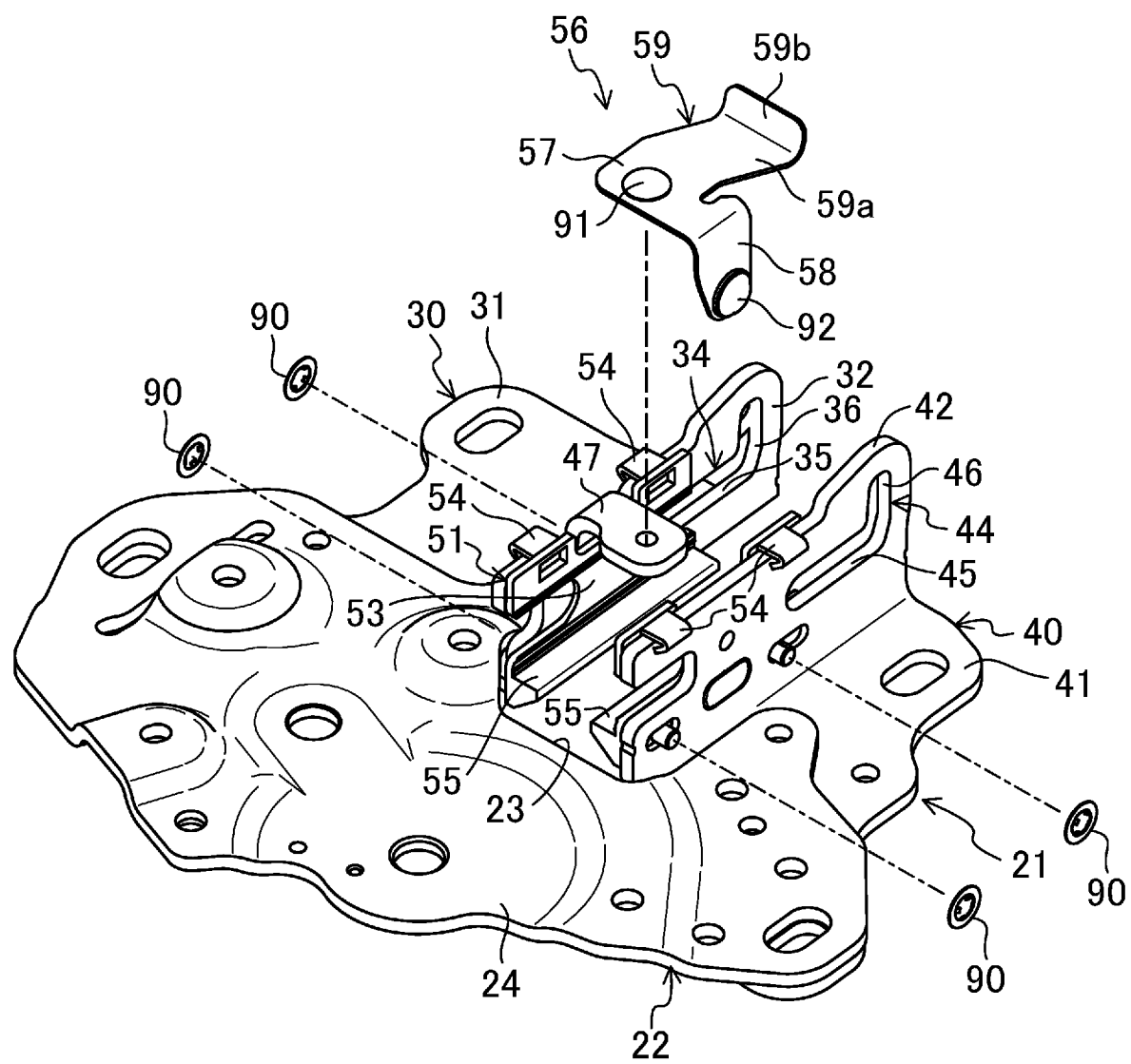
FIG. 8 is a perspective view of a support member of the roof lock device according to the embodiment which is viewed from below, and a part of which is developed.

As shown in FIG. 8, the second bracket 40 is provided with a plate-shaped, plate spring supporter 47 extending from the longitudinal middle portion of the lower edge of the second side plate 42 toward the first side plate 32.

As shown in FIG. 8, the guide members 51 and 52 are disposed between the first side plate 32 and the second side plate 42, and are respectively coupled to the first side plate 32 and the second side plate 42 through a fastening member (for example, a plurality of push nuts 90). The guide member 51 is a first guide member 51 formed along the inner surface of the first side plate 32. The guide member 52 is a second guide member 52 formed along the inner surface of the second side plate 42. The guide members 51 and 52 each have a vertical plate portion 53 extending along the corresponding one of the side plates 32 and 42, two crimp portions 54 formed at a position adjacent to the lower end of the vertical plate portion 53, and a rail portion 55 formed at a position adjacent to the upper end of each vertical plate portion 53.

Each crimp portion 54 holds the lower end of the corresponding one of the side plates 32 and 42. This positions the guide members 51 and 52 and the brackets 30 and 40. The pair of rail portions 55 and 55 is in the shape of a bar extending in parallel with each other in the longitudinal direction. An upper sliding portion 68a of the link member 66 is in sliding contact with the lower surface of each rail portion 55. That is to say, the guide members 51 and 52 guide the link member 66 in the longitudinal direction.

Figure 5:
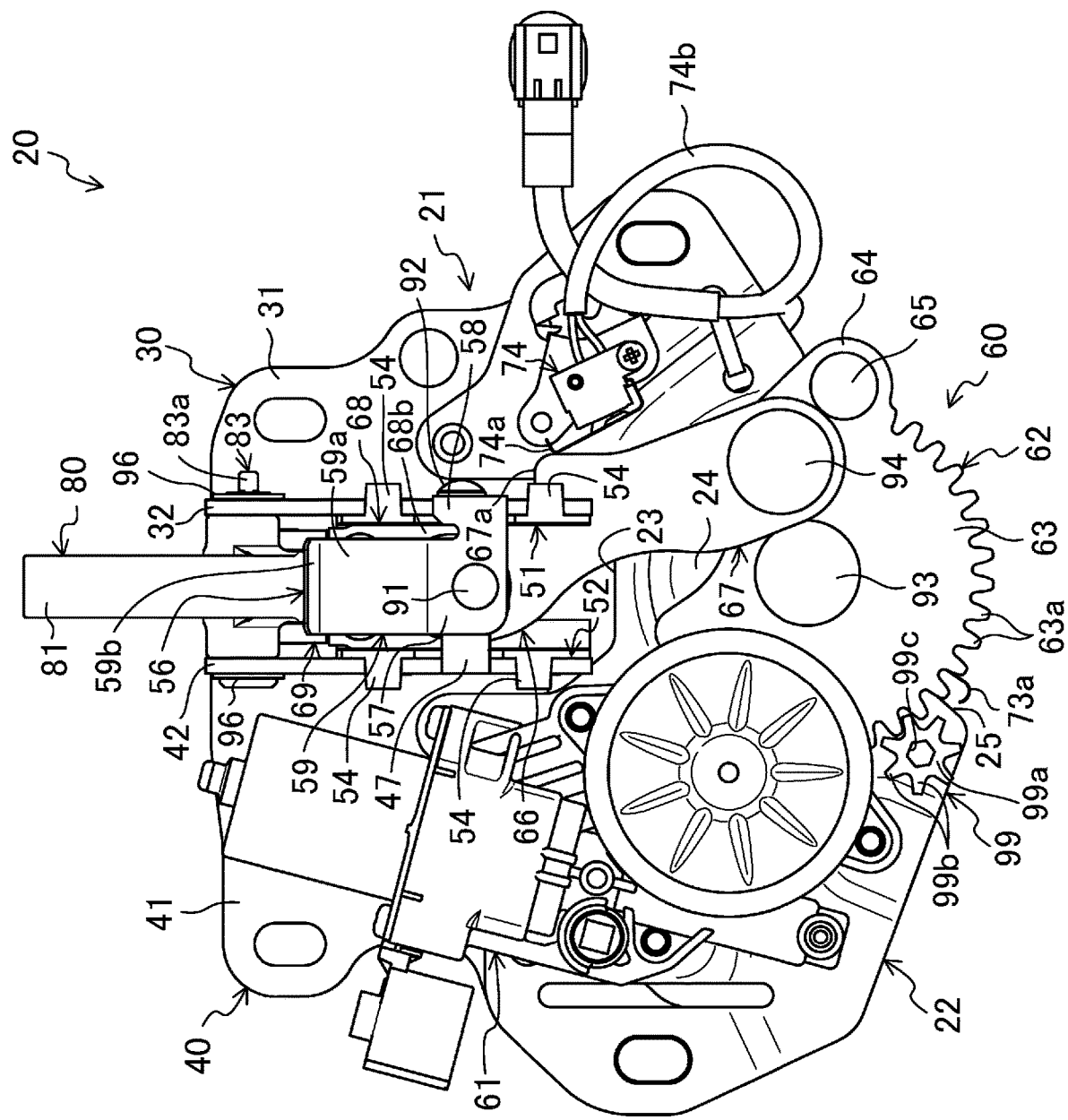
FIG. 5 is a bottom view illustrating the general configuration of the roof lock device according to the embodiment, in the unlocked state.

As shown in FIG. 5, the plate spring member 56 is disposed below the side plates 32 and 42. The plate spring member 56 has a base plate portion 57 fixed to the plate spring supporter 47 of the second bracket 40, a bent plate portion 58 extending upward from the right edge of the base plate portion 57, and a plate spring portion 59 extending forward from the base plate portion 57. The base plate portion 57 is in the shape of a rectangular plate, and is fixed to the lower surface of the plate spring supporter 47 via a fastening member (a screw 91). The bent plate portion 58 is in the shape of a substantially vertically elongated rectangular plate, and is fixed to the first side plate 32 of the first bracket 30 via a fastening member (a screw 92). The plate spring portion 59 is formed in the shape of a substantially longitudinally elongated rectangular plate. As shown in FIGS. 5 and 8, the plate spring portion 59 has a tilted portion 59a extending diagonally upward from the base plate portion 57, and a curved portion 59b curved downward from the front end of the tilted portion 59a. The plate spring portion 59 supports the lower surface of the hook member 80 from below, and applies a biasing force pushing the hook member 80 upward.

[Driver]

The driver 60 is provided to the support member 21, and is configured to allow the hook member 80 to switch between the locked state and the unlocked state. The driver 60 has an electric motor 61, a sector gear 62 (drive gear) driven to rotate by the electric motor 61, and a link member 66 coupled to the sector gear 62. The driver 60 has an emergency gear 99 (its details will be described later) meshing with the sector gear 62.

Figure 4:
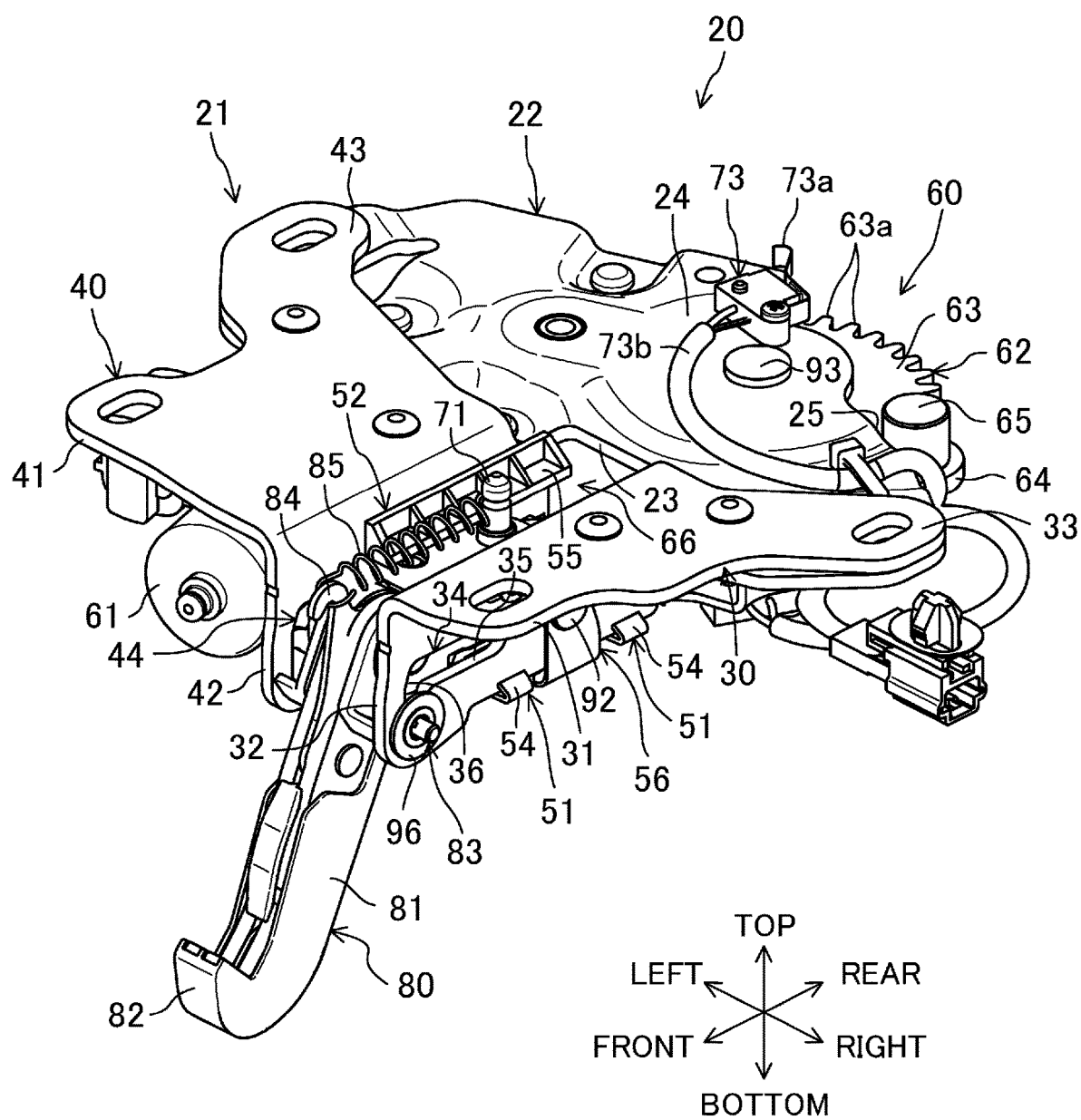
FIG. 4 is a perspective view illustrating a general configuration of a roof lock device according to the embodiment, in an unlocked state.

As shown in FIGS. 4 and 5, the electric motor 61 is attached to a left portion of the motor supporting plate 22. An output shaft of the electric motor 61 is coupled to the sector gear 62 via a pinion.

The sector gear 62 is disposed under the bulge 24 of the motor supporting plate 22. The sector gear 62 is in the shape of a substantially-flat-plate along the motor supporting plate 22. Most part of the sector gear 62 is covered with the motor supporting plate 22 from above. The sector gear 62 has a gear body 63, a coupling plate portion 64 jutting out of a side edge of the gear body 63, and the stopper 65 protruding upward from the upper surface of the coupling plate portion 64.

The gear body 63 is substantially fan-shaped or substantially semi-circular shaped, and includes a plurality of teeth 63a in its substantially arc-shaped outer periphery. The plurality of teeth 63a of the gear body 63 mesh with the pinion. A first bearing bolt 93 is inserted into the axial center of the gear body 63 (see, e.g., FIG. 9). The first bearing bolt 93 passes through the motor supporting plate 22, and constitutes a bearing rotatably supporting the gear body 63.

The coupling plate portion 64 is in the shape of a laterally elongated plate extending along the side edge of the sector gear 62. A second bearing bolt 94 is inserted into the coupling plate portion 64 at a position relatively near the axial center of the gear body 63. The second bearing bolt 94 couples the sector gear 62 and the base end (rear end) of the link member 66 together such that the link member 66 rotates relative to the sector gear 62.

The stopper 65 is fixed to the upper surface of the coupling plate portion 64 at a position relatively far from the axial center of the gear body 63. The stopper 65 is cylindrically-shaped with a circular lateral cross-section. The stopper 65 has a raised upper end protruding above the motor supporting plate 22.

The link member 66 is configured to move forward and rearward generally in the longitudinal direction along with the rotation of the sector gear 62. The link member 66 has a link body 67 coupled to the sector gear 62, a sliding member 68 attached to the front end of the link body 67, and a coupler 69 rotatably coupling the sliding member 68 and the hook member 80 together.

The link body 67 extends substantially longitudinally, and is in the shape of a substantially-flat-plate in parallel to the sector gear 62. The rear portion of the link body 67 is located below the motor supporting plate 22. The second bearing bolt 94 is inserted into the rear end of the link body 67. The front portion of the link body 67 is disposed between the pair of brackets 30 and 40.

Figure 9:
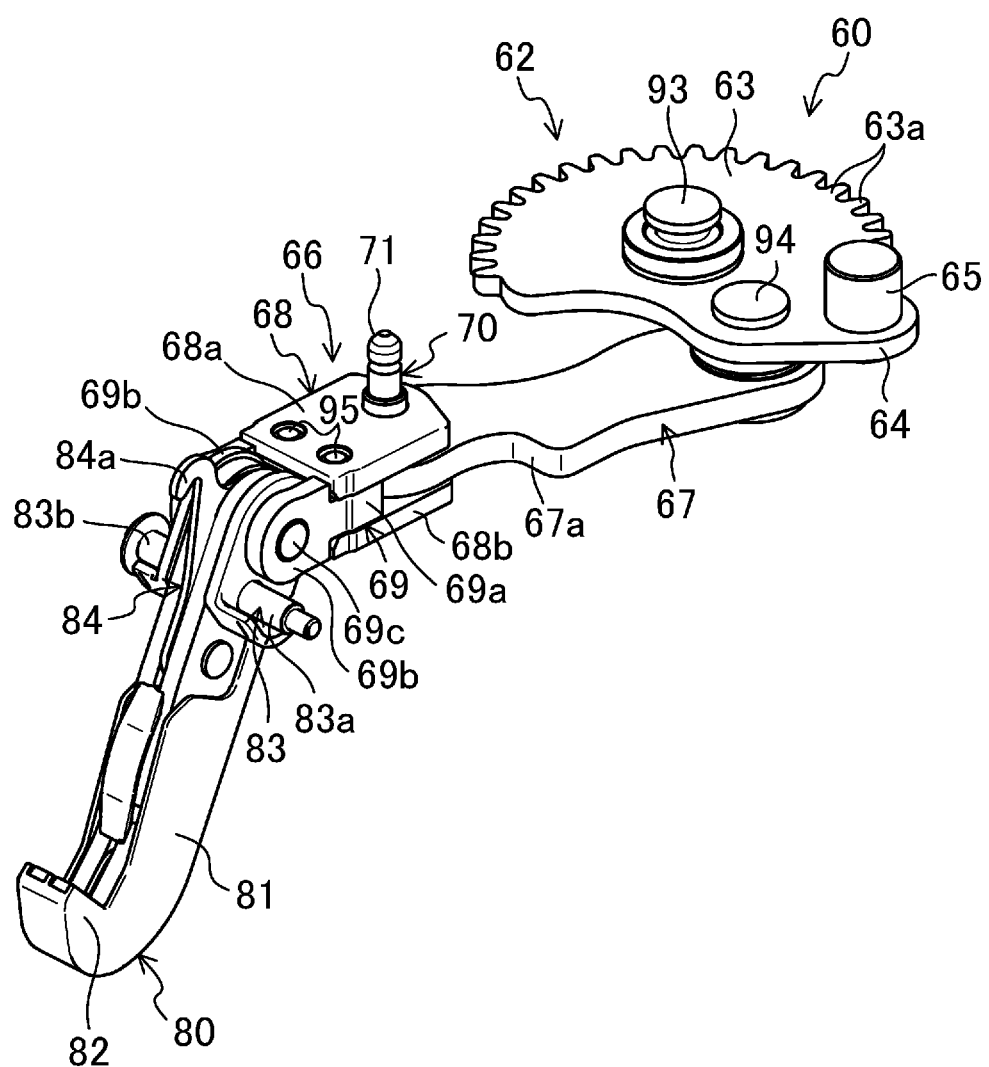
FIG. 9 is a perspective view illustrating a sector gear, a link member, and a hook member of the roof lock device according to the embodiment.
Figure 10:
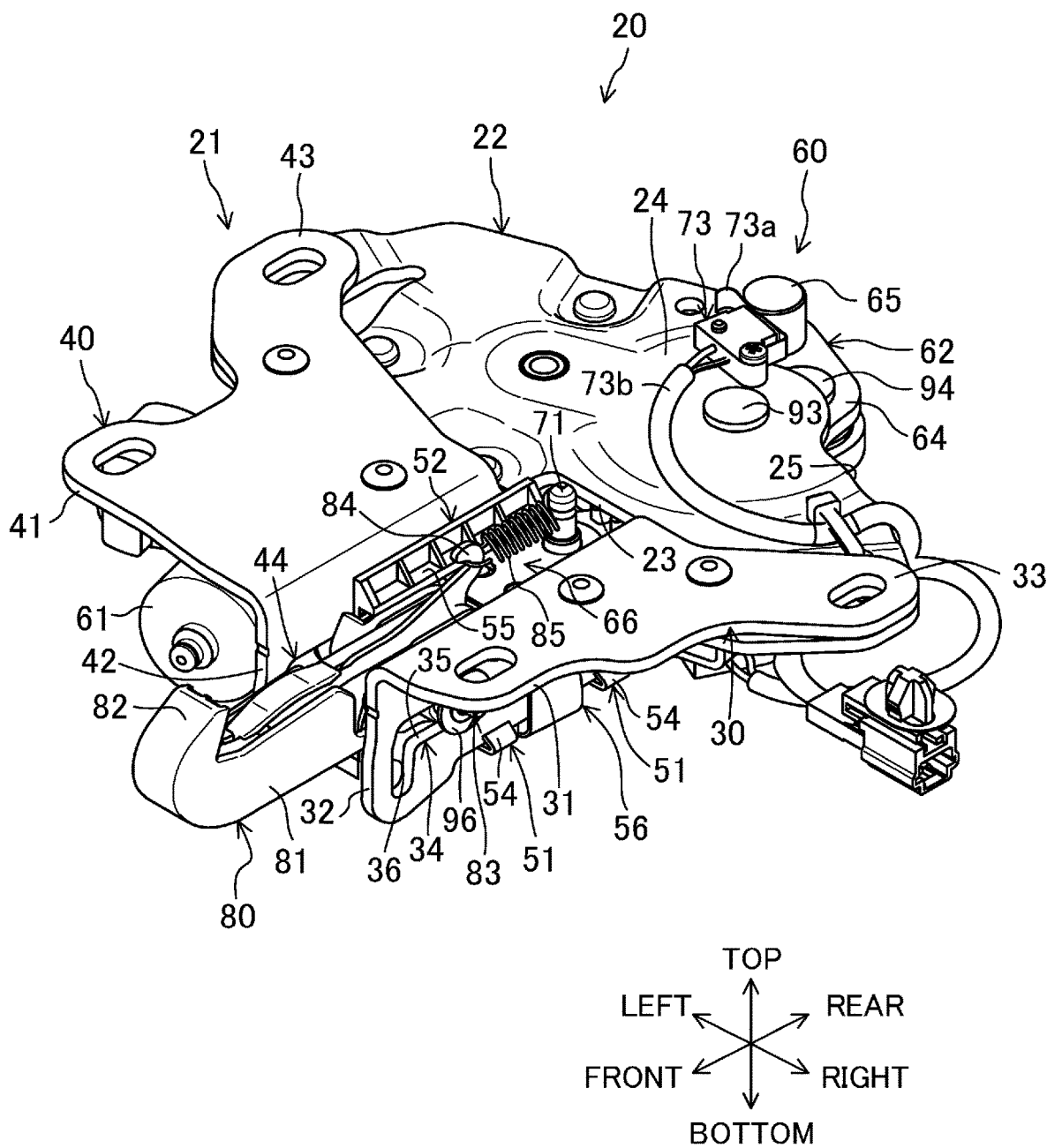
FIG. 10 is a perspective view illustrating the general configuration of the roof lock device according to the embodiment, in a locked state.

As shown in FIGS. 7 and 9, the right edge portion of the link body 67 includes an edge portion 67a protruding toward right front. The edge portion 67a is configured to move forward and rearward in the inside of the cutout recess 32a of the first side plate 32 of the first bracket 30.

Along with the forward and rearward movement of the link body 67, the sliding member 68 is guided by the pair of railing portions 55 and 55 to reciprocate in the longitudinal direction. The sliding member 68 has the upper sliding portion 68a and a lower sliding portion 68b. The upper sliding portion 68a is disposed above the front end of the link body 67, and the lower sliding portion 68b is disposed below the front end of the link body 67. The upper sliding portion 68a and the lower sliding portion 68b are in the shape of a longitudinally elongated flat-plate in parallel to the link body 67. The upper sliding portion 68a and the lower sliding portion 68b are fastened by a bolt 70 while sandwiching the link body 67. The bolt 70 has a protruding pin 71 further protruding upward from the upper sliding portion 68a. One end (rear end) of a spring 85 longitudinally extending and contracting is detachably fixed to the protruding pin 71 (see FIG. 4).

As shown in FIG. 9, the coupler 69 has a rectangular-pillar-shaped, base portion 69a, a pair of shaft supporting plates 69b protruding forward from right and left edges of the base portion 69a, and a connecting shaft 69c rotatably supported between the pair of shaft supporting plates 69b. The base portion 69a is coupled to the sliding member 68 via two screws 95 while being sandwiched between the upper sliding portion 68a and the lower sliding portion 68b. The connecting shaft 69c extends laterally so as to be orthogonal to the respective side plates 32 and 42 of the pair of brackets 30 and 40. The connecting shaft 69c rotatably supports the rear end of the hook member 80.

As shown in FIGS. 4 to 6, and 9 to 12, the driver 60 includes two limit switches 73 and 74, and a controller (not shown) controlling the electric motor based on a detection signal from the limit switches 73 and 74. The two limit switches 73 and 74 include a first limit switch 73 (a lock-side limit switch) detecting a state where the hook member 80 is in the locked state, and a second limit switch 74 (an unlock-side limit switch) detecting a state where the hook member 80 is in the unlocked state. The first limit switch 73 and the second limit switch 74 are connected to the controller (e.g., a controlling substrate) and other components via respective cables 73b and 74b.

The first limit switch 73 is attached to the upper surface of the motor supporting plate 22 at a position in the middle portion of the rear edge of the motor supporting plate 22, and near the second contact surface 26. The first limit switch 73 has a first switch portion 73a in the shape of a plate spring. The first switch portion 73a has a tip bent rearward. If the sector gear 62 rotates and reaches the second angular position, the stopper 65 makes contact with the second contact surface 26 so that the sector gear 62 does not rotate any more, and at the same time, the stopper 65 pushes the first switch portion 73a forward against the spring force. As a result, the first limit switch 73 turns ON, and outputs a signal indicating that the sector gear 62 is at the second angular position. The controller receives this signal, and stops the electric motor 61.

As can be seen, the first limit switch 73 abuts on the stopper 65 in contact with the second contact surface 26, detecting that the sector gear 62 is at the second angular position.

The second limit switch 74 is attached to the lower surface of the motor supporting plate 22 at a position overlapping with the first upper plate 31 of the first bracket 30. The second limit switch 74 has a second switch portion 74a in the shape of a plate spring. The second switch portion 74a has a tip bent diagonally rearward to the left, i.e., toward the link body 67. If the sector gear 62 rotates and reaches the first angular position, the edge portion 67a of the link body 67 pushes the second switch portion 74a forward against the spring force. As a result, the second limit switch 74 turns ON, and outputs a signal indicating that the sector gear 62 is at the first angular position. The controller receives this signal, and stops the electric motor 61.

[Hook Member]

As shown in FIG. 9, the hook member 80 is driven by the driver 60 to reciprocate in the longitudinal direction. The hook member 80 is configured to switch between the locked state where the hook member 80 engages with the striker 6 fixed to the vehicle body and the unlocked state where the hook member 80 disengages from the striker 6. The hook member 80 has a laterally long body 81 and a hook 82 formed at the front end of the body 81. The connecting shaft 69c of the coupler 69 is inserted into the rear end of the body 81. This allows the hook member 80 to rotate vertically with the connecting shaft 69c as a fulcrum. The hook 82 protrudes upward from the front end of the body 81. That is to say, the hook member 80 is substantially J-shaped when viewed from the side. In the hook member 80, the striker 6 is engageable between the body 81 and the hook 82 (see, e.g., FIG. 13).

The hook member 80 further has a pin 83 passing through a rear portion of the body 81 and a spring holder 84 protruding upward from the rear end of the body 81. The pin 83 extends laterally such that its axial center is in parallel to the connecting shaft 69c. The pin 83 includes a first protruding portion 83a protruding from the body 81 toward the right side, and a second protruding portion 83b protruding from the body 81 toward the left side.

The first protruding portion 83a and the second protruding portion 83b are substantially cylindrically-shaped with a circular vertical cross-section. The first protruding portion 83a is inserted into the first groove 34 of the first side plate 32, and the second protruding portion 83b is inserted into the second groove 44 of the second side plate 42. A washer 96 is fitted onto each of the protruding portions of 83a and 83b so as to be in sliding contact with (outer) side surfaces of the side plates 32 and 42 (see FIG. 4).

As shown in FIGS. 4 and 9, the spring holder 84 extends upward or rearward from the upper edge of the body 81. The spring holder 84 is in the shape of a vertically flat thin plate. The front end of the spring holder 84 includes a key portion 84a that is J-shaped when viewed from the side. The other end (front end) of the spring 85 is detachably fixed to the key portion 84a.

The spring 85 is stretched between the protruding pin 71 of the bolt 70 and the key portion 84a of the spring holder 84. The spring 85 biases the hook member 80 toward the rear.

<Emergency Gear>

Figure 11:
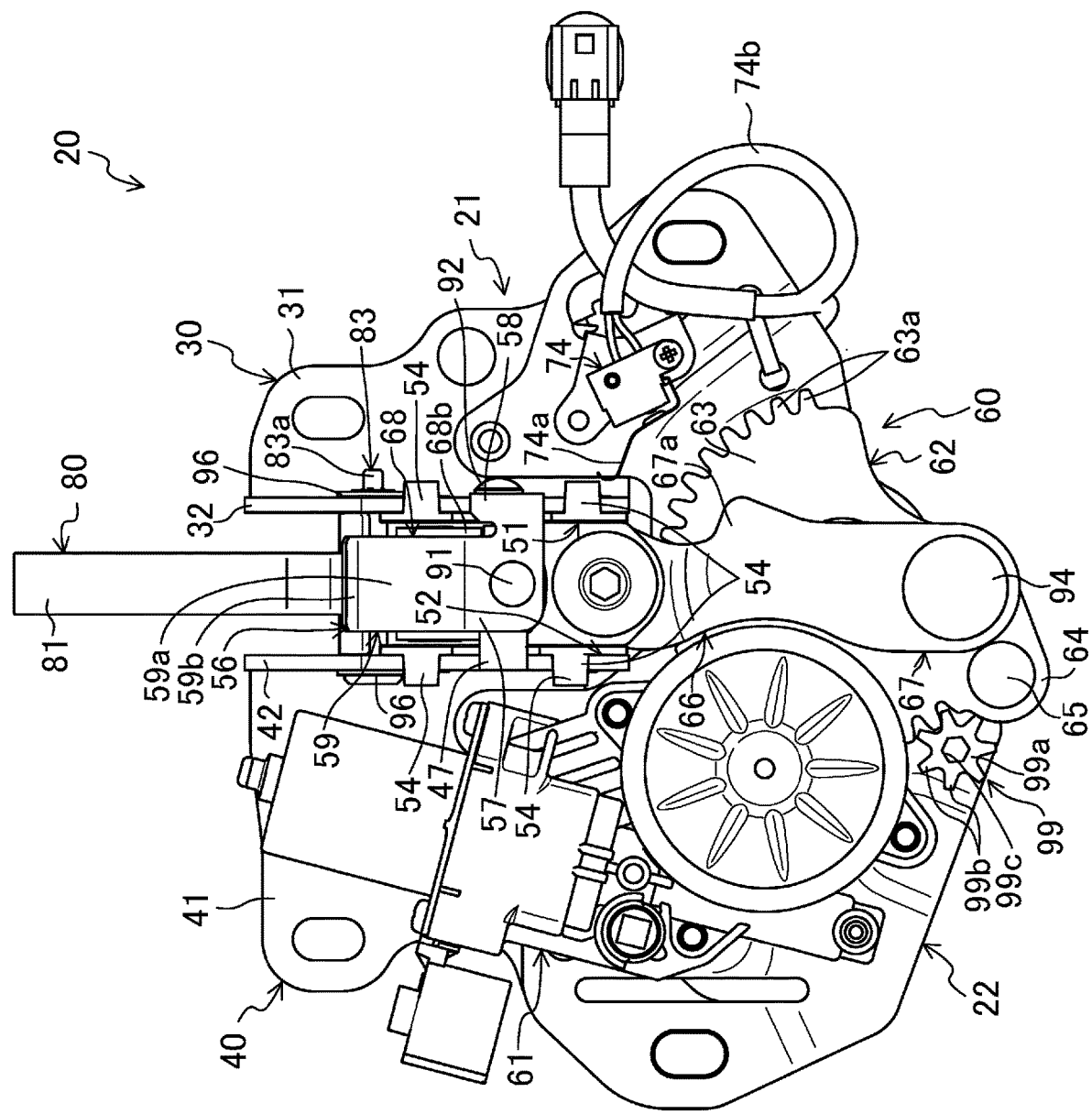
FIG. 11 is a bottom view illustrating the general configuration of the roof lock device according to the embodiment, in the locked state.

As shown in FIGS. 5 and 11, the roof lock device 20 has an emergency gear 99 (manually operable gear). The emergency gear 99 is disposed in the lower surface of the motor supporting plate 22 at a position adjacent to the sector gear 62. The emergency gear 99 meshes with the sector gear 62, and is rotatably supported by the motor supporting plate 22.

The emergency gear 99 has a cylindrically-shaped body 99a, and a plurality of teeth 99b formed on the outer peripheral surface of the body 99a. The body 99a of the emergency gear 99 has an axial center in parallel to the axial center of the sector gear 62. The center of the lower surface of the body 99a is provided with a hexagonal hole 99c constituting a fitting hole. A hexagonal wrench manually rotating the emergency gear 99 can be fitted into the hexagonal hole 99c.

The emergency gear 99 meshes with the sector gear 62 only, and has no connection with other components. That is to say, if the sector gear 62 rotates in the normal operation, it simply rotates without driving and rotating other members.

The diameter of the emergency gear 99 is significantly smaller than that of the sector gear 62. The diameter of the emergency gear 99 is preferably as small as possible but has a size large enough to provide the hexagonal hole 99c. This can reduce not only the size of the emergency gear 99 but also the load on the electric motor 61.

Operation of Roof Lock Device

The operation of the roof lock device 20 will now be specifically described below. The roof lock device 20 operates a first operation (a closing operation) of changing the state of the hook member 80 from the unlocked state (see FIGS. 10 to 12 and 14) to the locked state, and a second operation (an opening operation) of changing the state of the hook member 80 from the locked state (see FIGS. 4 to 7 and 13) to the unlocked state.

[First Operation]

When the hook member 80 is unlocked, the sector gear 62 is at the first angular position (see FIG. 5). In this state, the pin 83 of the hook member 80 enters the vertical grooves 36 and 46 of the first and second grooves 34 and 44, allowing the hook member 80 to face forward and diagonally downward (see FIG. 14). This unhooks the hook 82 of the hook member 80 from the striker 6.

Receiving a command to start the first operation, the controller controls the electric motor 62 such that the sector gear 62 rotates in the second rotation direction. If the sector gear 62 rotates in the second rotation direction, the second bearing bolt 94 moves rearward, and simultaneously, the link member 66 and the hook member 80 move rearward. If the hook member 80 moves rearward, the hook member 80 moves upward with the connecting shaft 69c as a fulcrum, and the pin 83 of the vertical groove 46 enters the lateral groove 45. The hook member 80 in the lateral position moves rearward along with the pair of brackets 30 and 40.

At that time, the pin 83 of the hook member 80 makes sliding contact with the upper edges of the grooves 34 and 44.

If the sector gear 62 further rotates and the stopper 65 of the sector gear 62 makes contact with the second contact surface 26 of the support member 21, the stopper 65 allows the first limit switch 73 to turn ON. The electric motor 61, receiving this ON signal, stops its operation. In this state, the hook member 80 engages with the striker 6 with a significantly large force to allow the hook member 80 to be in the locked state (see FIG. 13). In this locked state, the hook member 80 is biased upward by the plate spring member 56. At the same time, the hook member 80 is biased rearward by the spring 85. This allows the end of the striker 6 presses against the hook 82, reliably maintaining the locked state of the hook member 80.

[Second Operation]

When the hook member 80 is locked, the sector gear 62 is at the second angular position (see FIG. 11). In this state, the pin 83 of the hook member 80 is positioned the lateral grooves 35 and 45 of the first and second grooves 34 and 44, allowing the hook member 80 to extend horizontally (see FIG. 13).

If the controller receives a command to start the second operation, it controls the electric motor 61 such that the sector gear 62 rotates in the first rotation direction. The sector gear 62 rotates in the first rotation direction. As a result, the second bearing bolt 94 of the link member 66 moves forward, and along with this, the link member 66 and the hook member 80 move forward. If the stopper 65 of the sector gear 62 makes contact with the first contact surface 25 of the support member 21 (see FIG. 6), the edge portion 67a of the link member 66 allows the second limit switch 74 to turn ON (see FIG. 5). The electric motor 61, receiving this ON signal, stops its operation. As a result, the sector gear 62 can reliably be stopped at the first angular position.

When the sector gear 62 reaches the first angular position, the pin 83 of the hook member 80 falls from the lateral groove 45 to the vertical groove 46, allowing the striker 6 to face forward and diagonally downward. This unhooks the hook 82 of the hook member 80 from the striker 6.

Operation of Manually Operable Gear in Case of Failure or Other Causes

If the sector gear 62 cannot be driven to rotate due to, e.g., failure of the electric motor 61, the hook member 80 cannot move forward or rearward. Specifically, if the electric motor 61 is broken in a situation where, e.g., the roof member 12 is opened, the hook member 80 cannot be unlocked, and the top of the cabin 2 cannot be uncovered. Also, if the electric motor 61 is broken in a situation where, e.g., the roof member 12 is closed, the state of the hook member 80 cannot be changed to be in the locked state. Therefore, the roof member 12 cannot reliably be maintained in the closed state.

In case of emergency, i.e., in the case where the sector gear 62 cannot be driven by the electric motor 61, e.g., a driver manually drives and rotates the emergency gear 99 shown in FIGS. 5 and 11. Specifically, for example, the driver, accessing from the lower side of the roof lock device 20, fits the hexagonal wrench into the hexagonal hole 99c of the emergency gear 99. Rotating the hexagonal wrench in this state can bidirectionally rotate the emergency gear 99. As a result, the sector gear 62 can be rotated in the first rotation direction and the second rotation direction as appropriate.

Therefore, in this embodiment, even if the electric motor 61 is broken, the sector gear 62 can reliably be rotated in the first angular position and the second angular position, and the hook member 80 can reliably be in the locked state or the unlocked state.

«Other Embodiments»

The hexagonal hole 99c (fitting hole) of the emergency gear 99 is not limited to the hexagon. Alternatively, it may be quadrangle, pentagon, or other polygon, or a cross-shaped recess into which a screwdriver fits. That is to say, the fitting hole may have any shape as long as any tool fits into or engages with, and manually rotates the emergency gear 99.

INDUSTRIAL APPLICABILITY

As can be seen from the foregoing description, the present disclosure is useful for a roof lock device.

DESCRIPTION OF REFERENCE CHARACTERS

6 Engaged Portion
12 Roof Member
20 Roof Lock Device
60 Driver
61 Electric Motor
62 Sector Gear (Drive Gear)
66 Link Member
80 Hook Member
99 Manually Operable Gear

The invention claimed is:

1. A roof lock device which is disposed in a roof member of a vehicle, and which includes a hook member switchable between a locked state where the hook member engages with an engaged portion of a body of the vehicle, and an unlocked state where the hook member disengages from the engaged portion, the roof lock device comprising a driver having an electric motor, a drive gear driven to rotate by the electric motor, and a link member coupling the drive gear and the hook member together, and allowing the hook member to reciprocate longitudinally along with the rotation of the drive gear, wherein:

the driver further has a manually operable gear disposed to mesh with the drive gear and is able to be rotated by a certain tool, and the manually operable gear has a diameter smaller than the drive gear.

* * * * *